United States Patent
Kashid et al.

(10) Patent No.: US 11,483,150 B2
(45) Date of Patent: Oct. 25, 2022

(54) PRIVATE KEY CACHE IN SECURE ENCLAVE

(71) Applicant: salesforce.com, inc., San Francisco, CA (US)

(72) Inventors: Dhanashree Kashid, San Jose, CA (US); Raghavendran Hanumantharau, Fremont, CA (US); Terry Chong, Pleasanton, CA (US); Andrew Stewart Tucker, Redmond, CA (US); Vadiraj Govardhan Hosur, Santa Clara, CA (US)

(73) Assignee: salesforce.com, inc., San Francisco, CA (US)

( * ) Notice: Subject to any disclaimer, the term of this patent is extended or adjusted under 35 U.S.C. 154(b) by 86 days.

(21) Appl. No.: 16/889,285

(22) Filed: Jun. 1, 2020

(65) Prior Publication Data
US 2021/0377020 A1    Dec. 2, 2021

(51) Int. Cl.
*H04L 29/06* (2006.01)
*H04L 9/08* (2006.01)
(Continued)

(52) U.S. Cl.
CPC .......... *H04L 9/0894* (2013.01); *G06F 21/602* (2013.01); *G06F 21/62* (2013.01);
(Continued)

(58) Field of Classification Search
CPC ....... H04L 9/0894; G06F 21/602; G06F 21/62
See application file for complete search history.

(56) References Cited

U.S. PATENT DOCUMENTS

| | | |
|---|---|---|
| 5,937,187 A | 8/1999 | Kosche et al. |
| 7,111,005 B1 | 9/2006 | Wessman |

(Continued)

FOREIGN PATENT DOCUMENTS

| | | |
|---|---|---|
| AU | 2018290758 B2 | 8/2020 |
| AU | 2017356901 B2 | 12/2020 |

(Continued)

OTHER PUBLICATIONS

Harnik et al., "Securing the Storage Data Path with SGX Enclaves," https://arxiv.org/pdf/1806.10883.pdf; Jun. 28, 2018, 7 pages.
(Continued)

*Primary Examiner* — Jason K Gee
(74) *Attorney, Agent, or Firm* — Kowert, Hood, Munyon, Rankin & Goetzel, P.C.; Catherine L. Gerhardt; Dean M. Munyon (57) ABSTRACT

Disclosed techniques relate to storing a key cache within a secure enclave. In some embodiments, a computing system receives, from an application, a request to access a database, where the request is associated with a particular account. The computing system then accesses, using an identifier associated with the particular account, a key cache stored in a secure enclave of a memory of the computing system to determine at least one private key associated with the request, where the key cache stores private keys of a key management system (KMS) for a plurality of accounts. The computing system performs a cryptographic operation for accessing the database within the secure enclave using the at least one private key. In various embodiments, disclosed techniques may improve the security of cryptographic private keys cached for a plurality of tenants.

20 Claims, 6 Drawing Sheets

(51) Int. Cl.
  *G06F 21/60* (2013.01)
  *G06F 21/62* (2013.01)
  *H04L 9/14* (2006.01)

(52) U.S. Cl.
  CPC ........ *H04L 9/14* (2013.01); *G06F 2221/2107* (2013.01); *H04L 2209/16* (2013.01)

(56) References Cited

U.S. PATENT DOCUMENTS

| | | | |
|---|---|---|---|
| 7,797,342 B2 | 9/2010 | Banks et al. | |
| 7,840,839 B2 | 11/2010 | Scales et al. | |
| 8,694,828 B2 | 4/2014 | Nelson et al. | |
| 8,819,383 B1 | 8/2014 | Jobanputra et al. | |
| 10,353,723 B2 | 7/2019 | Hanumantharau et al. | |
| 10,523,425 B2 | 12/2019 | Hanumantharau et al. | |
| 10,621,071 B2 | 4/2020 | Martin et al. | |
| 10,691,693 B2 | 6/2020 | Fanghaenel et al. | |
| 10,872,066 B2 | 12/2020 | Martin et al. | |
| 11,240,007 B1* | 2/2022 | Higgins | H04L 9/0827 |
| 2002/0166053 A1* | 11/2002 | Wilson | G06F 21/78 |
| | | | 713/189 |
| 2003/0204732 A1* | 10/2003 | Audebert | H04L 9/0822 |
| | | | 713/182 |
| 2004/0148344 A1* | 7/2004 | Navar | H04L 67/1078 |
| | | | 709/219 |
| 2010/0257351 A1* | 10/2010 | O'Connor | G06F 21/606 |
| | | | 713/150 |
| 2016/0106382 A1 | 4/2016 | Lu et al. | |
| 2019/0097791 A1* | 3/2019 | Hersans | G06F 12/123 |
| 2019/0163613 A1 | 5/2019 | Martin et al. | |
| 2020/0097205 A1 | 3/2020 | Fanghaenel et al. | |
| 2020/0097581 A1 | 3/2020 | Chong et al. | |
| 2020/0201745 A1 | 6/2020 | Martin et al. | |
| 2020/0250325 A1 | 8/2020 | Chong et al. | |

FOREIGN PATENT DOCUMENTS

| | | |
|---|---|---|
| AU | 2018290745 B2 | 12/2020 |
| EP | 2130159 B1 | 6/2019 |

OTHER PUBLICATIONS

Google Cloud Platform, Introducing Asylo: an open-source framework for confidential computing; https://cloud.google.com/blog/products/gcp/introducing-asylo-an-open-source-framework-for-confidential-computing; 5 pages. [Retrieved May 28, 2020].

Hosur et al., "Cache Management for Encryption Key Rotation," U.S. Appl. No. 16/849,401, filed Apr. 15, 2020, 33 pages.

* cited by examiner

PRIVATE KEY CACHE IN SECURE ENCLAVE

BACKGROUND

Technical Field

Embodiments described herein relate to database technology and, in particular, to storage of a cryptographic private key cache in a secure enclave.

Description of the Related Art

Database systems often encrypt data before storage and decrypt the data on retrieval, e.g., to increase data security. Private keys may be fetched from a centralized key management system (KMS). In multi-tenant database systems different private keys may be used for different accounts that store information in the same database table. Keys may be rotated periodically or accounts may request key rotation. Any delays associated with fetching keys may add latency to cryptographic processes. Maintaining cryptographic private keys for multiple accounts in a single location may elicit attacks such as key swapping, memory dump capturing, privilege escalation etc. from attackers attempting to gain access to private keys for various accounts.

This disclosure includes references to "one embodiment," "a particular embodiment," "some embodiments," "various embodiments," "an embodiment," etc. The appearances of these phrases do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "multi-tenant database system configured to perform one or more cryptographic operations" is intended to cover, for example, a computer system that performs this function during operation, even if it is not currently being used (e.g., when its power supply is not connected). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a computing system having multiple user accounts, the terms "first" and "second" user accounts can be used to refer to any users. In other words, the "first" and "second" user accounts are not limited to the initial two created user accounts, for example.

When the term "or" is used in this disclosure with respect to a list of options, it will generally be understood to be used in the exclusive sense unless the context provides otherwise. Thus, a recitation of "x or y" is equivalent to "either x or y, but not both." On the other hand, a recitation such as "x or y, or both" is to be interpreted in the inclusive sense. A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

As used herein, a "module" refers to software and/or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as operable to perform operations refers to a software module, a hardware module, or some combination thereof.

DETAILED DESCRIPTION

The present disclosure describes embodiments of a database system configured to cache cryptographic private keys for multiple tenants within a secure memory enclave and manage the cached keys to facilitate cryptographic database operations for accessing tenant fragments of data. The database system may store data for multiple tenants in the same logical database table but may use different cryptographic private keys for the different tenants. The database system may cache the different cryptographic keys and may handle requests to access secure data using these cached keys. Implementation of the key cache within the secure enclave may advantageously prevent or reduce unauthorized access to private keys belonging to a plurality of different tenants (where a particular tenant may be associated with one or more accounts). As used herein, the term "private key" refers to a cryptographic material that is used with an encryption algorithm to alter data. For example, a private key may be a symmetric key that includes a string of characters (e.g., letters and/or numbers). That is, a single private key may be used to both encrypt and decrypt data for a particular account or tenant. A private key may be referred to as an encryption key.

Traditionally, multi-tenant database systems individually encrypt data for different tenants. For example, each tenant may have their own cryptographic private key that the database engine uses to encrypt or decrypt fragments of data associated with a given tenant. In addition, these tenants may be allowed to manage the lifecycle of their cryptographic keys by rotating through a set of keys (e.g., ten different keys). These keys are maintained in a key management system (KMS) as a single active key (a write key) used to encrypt data for a given tenant and non-active keys (read keys) used to decrypt data for the given tenant. In some situations, the active key may also be used to read data for a given tenant. During times of heavy traffic, however, the multi-tenant database system may become overwhelmed when frequently encrypting and decrypting various tenant fragments in the database because it will have to make multiple calls to the KMS (which is external to the database system). This may delay processing times and also block other database operations on portions of the database, which in turn may increase network failures and latency.

The present disclosure describes techniques for storing private keys for a plurality of tenants in a key cache. Such disclosed techniques may advantageously reduce the number of calls to the external KMS, which in turn may improve the efficiency of a multi-tenant database system. Protecting private information stored in the disclosed key cache (e.g., key identifiers (IDs) and private keys (e.g., raw key bytes)) is vital. In the absence of a proper protection mechanism, the key cache may become vulnerable to various local attacks. For example, an attacker may be able to access cached tenant keys through privilege escalation, by attempting to swap keys to disk, by capturing a memory dump, etc. In addition, an attacker who has obtained a key ID from the key cache and obtained access to the database host may use the key ID to query a KMS to obtain private keys by presenting necessary host certificates for validation.

In some embodiments, the key cache may be implemented within the boundary of a secure memory enclave. For example, the key cache may be stored in an Intel Software Guard Extension (SGX) enclave, Asylo enclave on the Google Cloud Platform, etc. A secure enclave prevents processes or systems operating outside the enclave from accessing content of the secure enclave. The disclosed techniques implement trusted code within the secure enclave boundary to determine cryptographic private keys for accessing a database. In addition to protecting the contents of the key cache within a secure memory enclave, a multi-tenant database system may implement key cache obfuscation (e.g., digital logic operations on raw key data before storage in the key cache) and encryption of contents of the key cache itself using a system key (e.g., an ephemeral key).

Example Secure Key Cache Storage

Figure 1:
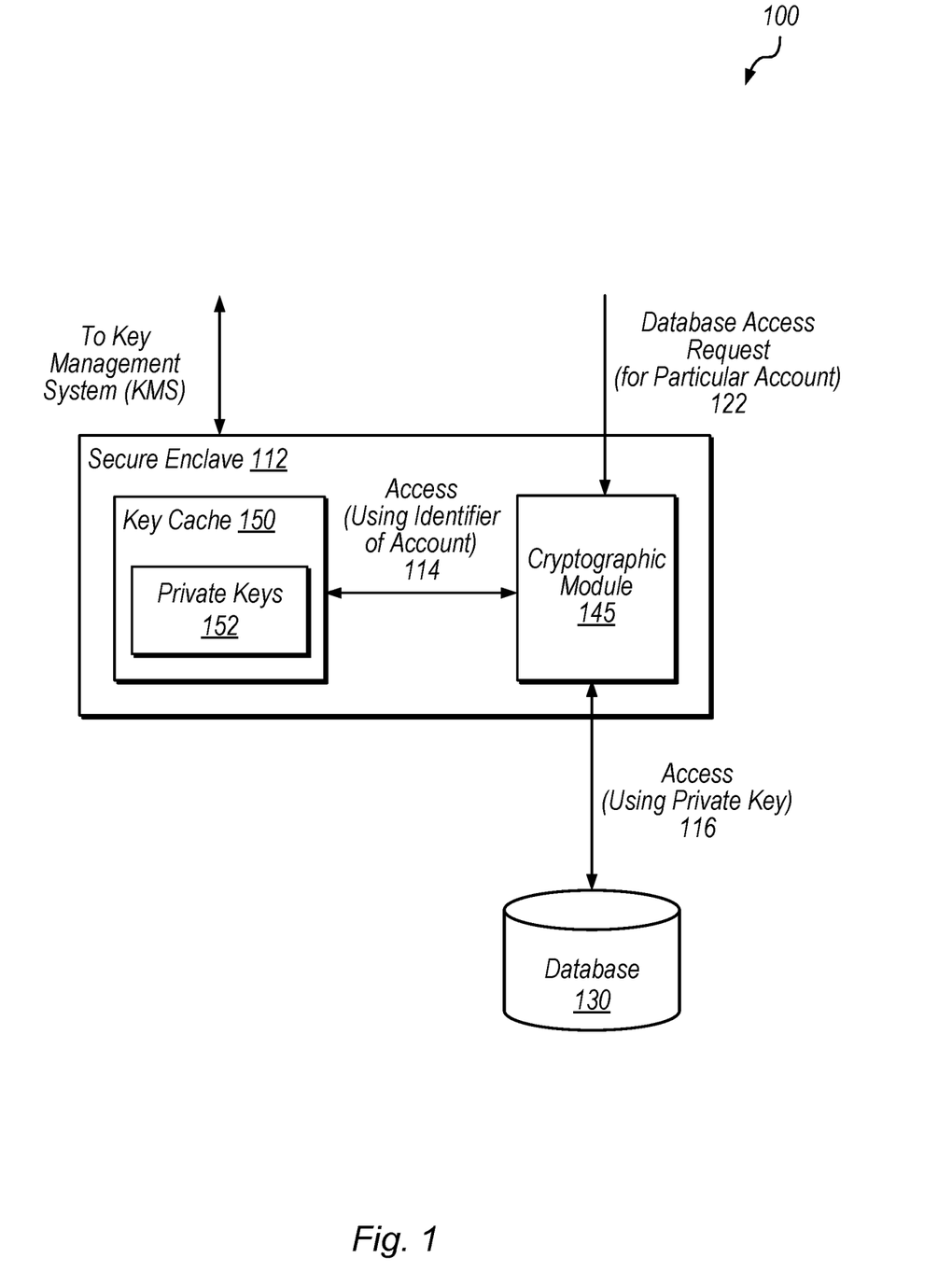
FIG. 1 is a block diagram illustrating an example system configured to implement a secure enclave for storing cached private keys, according to some embodiments.

FIG. 1 is a block diagram illustrating an example system configured to implement a secure enclave for storing cached private keys. In the illustrated embodiment, system 100 includes a secure enclave 112 (which in turn includes a key cache 150 and a cryptographic module 145) and a database 130.

Cryptographic module 145 is executable within secure enclave 112 to perform various cryptographic operations for accessing database 130. For example, module 145 may perform an encryption or decryption operation. In the illustrated embodiment, cryptographic module 145 receives a request 122 to access database 130. Request 122 may be received from an application server interfacing with one or more applications used by different accounts. The request 122 identifies a particular account being used to gain access to the database. Based on an account identifier (ID) specified in request 122, cryptographic module 145 is executed to perform access 114 of key cache 150 to determine one or more private keys 152 stored in key cache 150. Cryptographic module 145 then executes a cryptographic operation within secure enclave 112 using at least one determined private key to perform access 116.

Secure enclave may be a secure, bounded portion of a memory of a multi-tenant database system that is accessible only to processes or system operating within secure enclave 112. As used herein, the term "secure enclave" is intended to be construed according to its well-understood meaning, which includes a region of memory that is private such that its contents are not accessible to any process running externally to the secure enclave itself. For example, the contents of the secure enclave are encrypted and will only be decrypted on the fly for portions of program code being executed from within the secure enclave. In this way, other processes and systems (e.g., the operating system, a hypervisor, etc.) attempting to read data stored in the secure enclave are only able to see the encrypted form of the data. One example of a secure enclave is the Intel Software Guard Extensions (SGX). In some situations, program code (e.g., encryption or decryption operations, or both) that is stored within the secure enclave may be implemented to access data stored in the secure enclave.

In some embodiments, based on access 116, cryptographic module 145 is executable to provide a response to the particular account. For example, in the case of a read operation, cryptographic module 145 may decrypt data stored in database 130 using a determined private key. In contrast, in the case of a write operation, cryptographic module 145 may encrypt data specified in request 122 and store the encrypted data in database 130. Example methods for such cryptographic operations are discussed in detail below with reference to FIGS. 2A and 2B.

In some embodiments, cryptographic module 145 is executable to access a key management system (KMS) to obtain private keys. For example, in case of a miss at key cache 150, cryptographic module 145 may access a key management system to determine a private key and then cache the determined private key in key cache 150 for later use.

In some embodiments, the database is a multi-tenant database that stores data for a plurality of tenants. For example, a particular tenant may request access to data that is stored in the database 130 with other tenant data and is accessible to the particular tenant, but not other tenants (absent permission). In some embodiments, secure enclave 112 is included in a multi-tenant database system.

As used herein, the term "multi-tenant database system" refers to those systems in which various elements of hardware and software of the database system are shared by one or more customers. For example, a computer system may simultaneously process requests for a great number of customers, and a database table may store rows for a potentially greater number of customers. In various embodiments, data for different tenants may be securely stored such that other tenants cannot access the data, absent permission.

As used herein, the term "fragment" refers to a collection of database records that correspond to one or more database objects stored in a database. For example, a fragment may include key-value pairs that correspond to rows in a database table. In some embodiments, fragments are associated with a particular tenant. A tenant may make several updates to values in a database table and a database management system writes those updates as a set of new database records (replacing older versions of those records, but still maintaining older versions of the records). In this example, the set of new database records make up a tenant fragment. In some situations, a tenant fragment may include a single record or a portion of a record based on updates made by a particular tenant.

Example Methods for Accessing a Database

Figure 2A:
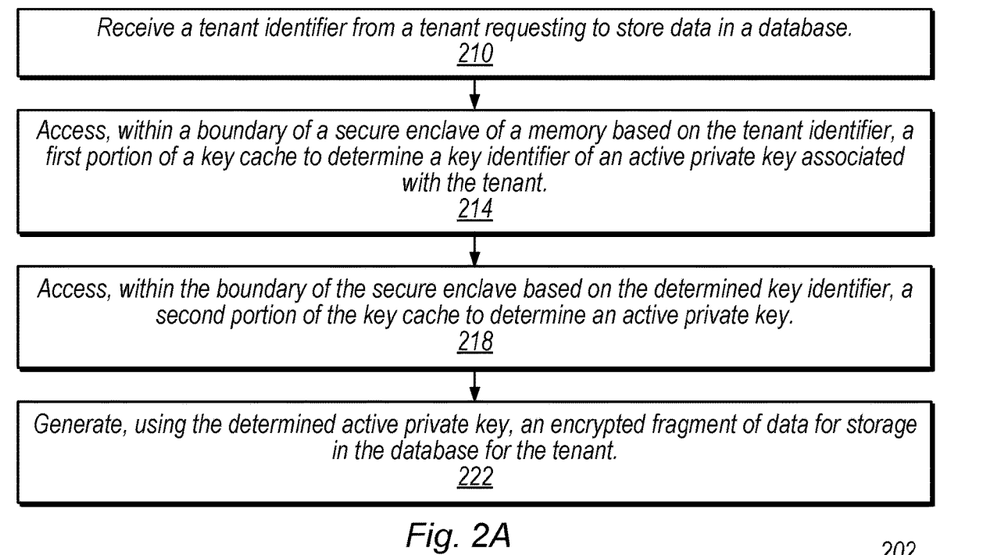
FIGS. 2A and 2B are flow diagrams illustrating example methods for encrypting tenant fragments and decrypting tenant fragments, respectively, according to some embodiments.
Figure 2B:
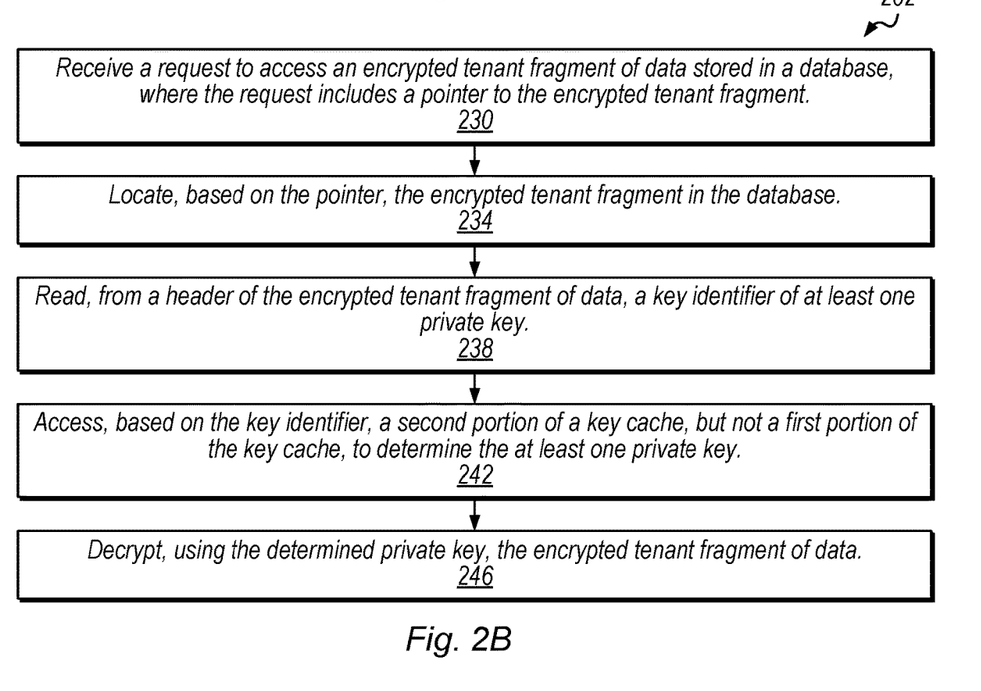

FIGS. 2A and 2B are flow diagrams illustrating example methods for encrypting tenant fragments and decrypting tenant fragments, respectively. Methods 200 and 202 shown in FIGS. 2A and 2B may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 210, in the illustrated embodiment, a computing system receives a tenant ID from a tenant requesting to store data in a database. The tenant ID may be specified in a request to access a particular tenant fragment, for example.

At 214, the computing system accesses, within a boundary of a secure enclave of memory based on the tenant ID, a first portion of a key cache to determine a key ID of an active private key associated with the tenant. At 218, the computing system accesses, within the boundary of the secure enclave based on the determined key ID, a second portion of the key cache to determine an active private key.

At 222, the computing system generates, using the determined active private key, an encrypted fragment of data for storage in the database for the tenant. For example, a multi-tenant database system may execute program code to perform a database write operation. This code may be untrusted such that it does not have access to the contents of secure enclave 112. In this example, the write program code executes an encryption function that is trusted. That is, the write code has access to contents of secure enclave 112 (and is itself stored within the secure enclave). When the write code executes the encryption function, it passes a tenant ID and a pointer, to the tenant fragment, to the function. The encryption function then looks up the tenant ID in the first portion of the key cache and determines a key ID of the tenant's active write key.

In some situations, a private key (as opposed to the ID of the private key) is referred to as the key material. The encryption function then accesses a second portion of the key cache using the determined key ID to obtain the tenant's active write key (raw key bytes). The encryption function encrypts a tenant fragment in-place within general memory using the obtained active write key. The encrypted fragment may then be persisted to database 130.

At 230, in the illustrated embodiment, a computing system receives a request to access an encrypted tenant fragment of data stored in a database (e.g., database 130). In some embodiments, the request includes a pointer to the encrypted tenant fragment. At 234, the computing system locates, based on the pointer, the encrypted tenant fragment in the database.

At 238, the computing system reads, from a header of the encrypted tenant fragment of data, a key ID of at least one private key. Headers of tenant fragments store key IDs (handles) for read keys. These key IDs are used by the database management system during reads from the database to fetch the appropriate private key from the key cache (or KMS if the cache does not contain the private key corresponding to the determined key ID).

At 242, the computing system accesses, based on the key ID, a second portion of the key cache, but not the first portion of the key cache, to determine at least one private key. In some embodiments, based on a cache miss, the computing system retrieves one or more private keys from the KMS and updates the key cache.

In some embodiments, the computing system reads multiple key IDs from the header of an encrypted tenant fragment and locates multiple private keys in the second portion of the key cache. These multiple private keys may include one or more inactive read keys and an active write key. For example, in some embodiments, an encrypted fragment may include data that was written in multiple batches (using different active write keys). In such situations, accessing this fragment may require obtaining multiple private keys from the key cache. In other embodiments, each tenant fragment is only written to a single time. For example, once a multi-tenant database system writes data to a particular tenant fragment and commits it, that tenant fragment becomes immutable and new data cannot be added to it. In such situations, a tenant fragment is considered as a single unit that cannot be subdivided by the multi-tenant database system. As a result, if the database system needs to write more data, it creates a new tenant fragment. Therefore, there is a single private key per tenant fragment.

At 246, the computing system decrypts, using the determined private key, the encrypted tenant fragment of data. For example, a multi-tenant database system may read a key ID from the header of a tenant fragment of data. The multi-tenant database system then executes program code to perform a database read operation. This program code is untrusted, but is executable to implement a decryption function (within secure enclave 112) that is trusted. Upon execution of the decryption function, the database read code passes the key ID and a pointer to an encrypted tenant fragment. The decryption function accesses, within the boundary of secure enclave 112, the second key cache using the key ID to determine a read key (key material). Once it has determined a read key, the decryption function decrypts the encrypted tenant fragment in-place. The multi-tenant database system may then read the contents of the decrypted tenant fragment and pass this information to the tenant requesting this information. In some situations, the decrypted fragment of data (which has been decrypted from cypher text to plain text) may be provided to the database block cache to perform database operations (such as sorting).

In some situations, the requestor may be authenticated (e.g., via certificate) before it may retrieve the encryption key for a particular tenant from the key cache or the KMS. Storage of private keys for a plurality of tenants in a key cache that is implemented within a secure enclave may advantageously prevent attackers from gaining access to tenants' private data. For example, the disclosed techniques may prevent attackers from obtaining tenants' private keys via privilege escalation, attempting to swap keys to disc, capturing a memory dump, etc.

Example System with Secure Key Caching

Figure 3:
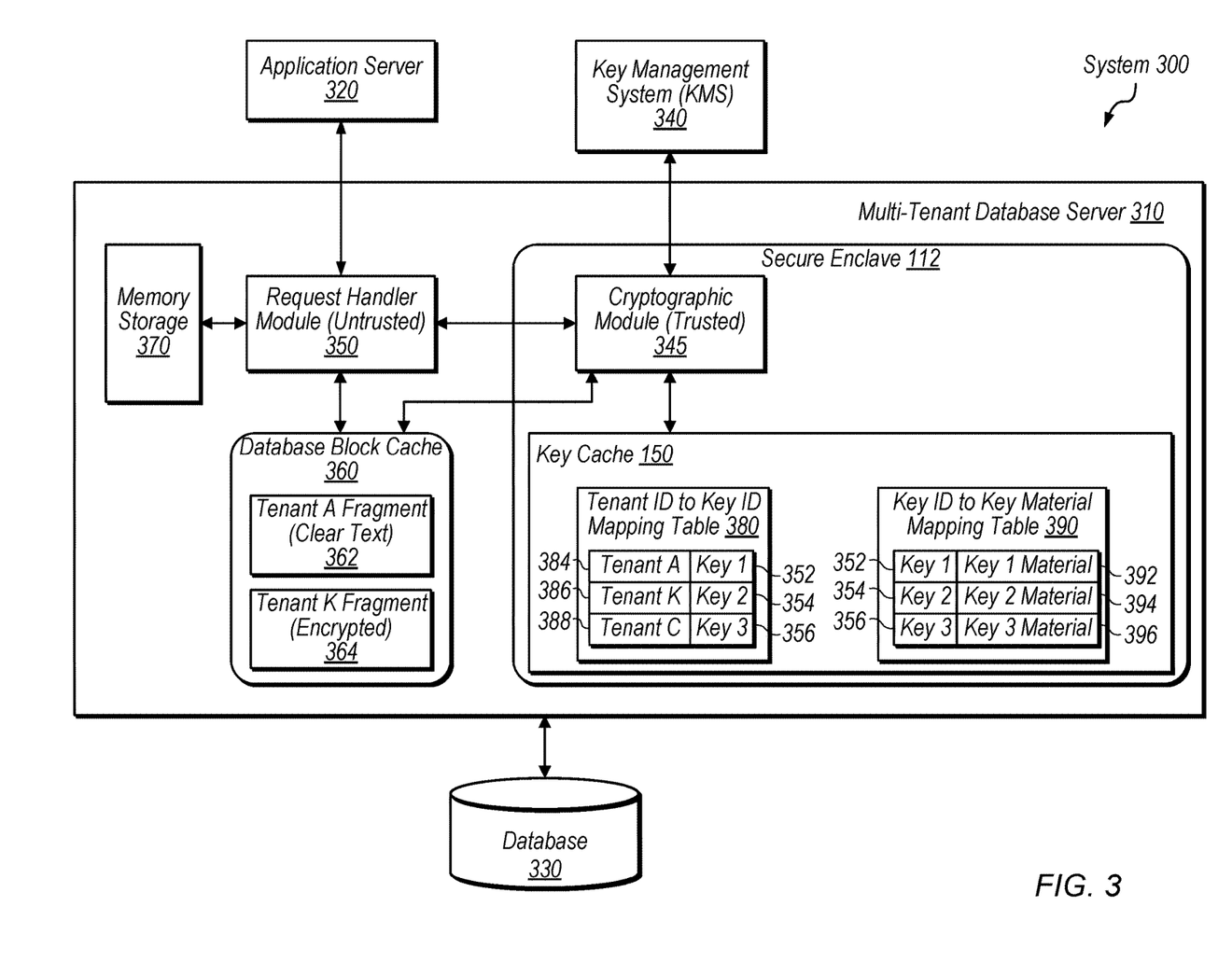
FIG. 3 is a block diagram illustrating a more detailed example system that includes a multi-tenant database server, according to some embodiments.

FIG. 3 is a block diagram illustrating a more detailed example system that includes a multi-tenant database server 310. In the illustrated embodiment, system 300 includes multi-tenant database server 310, application server 320, database 330, and key management system (KMS) 340.

Multi-tenant database server 310, in the illustrated embodiment, includes a secure enclave 112 (which in turn includes a cryptographic module 345), request handler module 350, database block cache 360, and memory storage 370. Request handler module 350, in the illustrated embodiment, handles requests from application server 320. Multi-tenant database server 310 may store tenant data in various locations, including database 330, database block cache 360, and memory storage 370. Request handler module 350 may determine the location of data relevant to requests and route the requests to the appropriate module.

Cryptographic module 345, in some embodiments, is operable to encrypt data for storage in database 330 and decrypt data read from database 330 within the boundary of secure enclave 112. In the illustrated embodiment, cryptographic module 345 is operable to communicate with key management system 140 to retrieve tenant keys for storage in cache 150. In addition, cryptographic module 345 is trusted by secure enclave 112 and is operable to access mappings stored in key cache 150. In some embodiments, storing key cache 150 and implementation of cryptographic operations (via cryptographic module 345) within secure enclave 112 may advantageously reduce or prevent unauthorized access to private keys of a plurality of tenants. Cryptographic module 345 is one example of cryptographic module 135 of FIG. 1.

In some embodiments, cryptographic module 345 is configured to implement the techniques of FIGS. 2A and 2B discussed above. As discussed above, in response to receiving requests to access database 330, multi-tenant database server 310 may execute request handler 350 to implement one or more cryptographic operations for obtaining and using private keys to encrypt or decrypt data for a particular tenant.

Key cache 150, in the illustrated embodiment, maintains mappings between tenant IDs 384-388 and key IDs 352-356 in table 380 and mappings between key IDs 352-356 and key material 392-396 in table 390. For example, in FIG. 3, table 380 maps tenant A to key 1, tenant K to key 2, and tenant C to key 3. Similarly, table 390 maps key 1 to key 1 material, key 2 to key 2 material, and key 3 to key 3 material. Note that table 380 is stored within a first portion of key cache 150, while table 390 is stored in a second portion of key cache 150.

In some embodiments, tenants are able to rotate their private key to a new private key by setting the new private key as their active private key, such that it will be used by a database server for subsequent encryption operations. For example, tenants may submit requests via an application serviced by application server 320 to rotate their private key. Based on such requests, application server 320 implements key rotation and validation code to provide the tenant with a new private key. Thus at any given time, tenants of the database have a single active key used for encrypting new data (referred to as a write key) and one or more previous non-active keys (referred to as read keys) which may be used to decrypt data that was previously encrypted using the same keys (under their active write key designation).

In some situations, when a particular tenant requests to rotate their key, the multi-tenant database system 310 evicts the active key entry (e.g., tenant ID mapping to key ID) from table 380. Upon the next write operation for that particular tenant, trusted cryptographic module 345 fetches (or generates) a new active key from KMS 340 and stores the information for this key in key cache 150. Because tenants are allowed to rotate their active key, key cache 150 is implemented by multi-tenant database server 310 as two separate portions. That is, key cache 150 includes a first portion (e.g., table 380) that maps tenant IDs to key IDs of active private keys, and a second portion (e.g., table 390) that maps key IDs to key material for both active and non-active private keys.

In some embodiments, contents of key cache 150 are obfuscated using various binary operations. For example, prior to caching private keys in key cache 150, multi-tenant database server 310 may perform an XOR operation (or any of various types of binary logical operations) on these private keys. In some situations, server 310 obfuscates only a subset of the keys stored in key cache 150. Other examples of obfuscation techniques include slot files, cache dumps, etc. Such obfuscation techniques may advantageously improve the security of private keys stored in key cache 150.

Database 330, in some embodiments, is shared among multiple different database servers and implements database storage. In some embodiments, encrypted data in database 330 is organized into data extents that each may include multiple fragments (where a given fragment includes data that is encrypted using a given tenant's encryption key). Therefore, as discussed above with reference to FIGS. 2A and 2B, each fragment may include data for only a single tenant. Some data extents may include multiple fragments for a given tenant. Database 330 may also include a block index per data extent that identifies the fragments included in the extent. For example, the index may include index numbers of a database table in database 330 for the fragments in the data extent. In some embodiments, the block index is encrypted using a system encryption key. In some embodiments, cryptographic module 345 may continue to write encrypted fragments within a data extent for other tenants while one of the tenants sharing the data extent is waiting for a new encryption key. In some embodiments, system 300 maintains a storage catalog to indicate the locations of data extents in database 330.

Database 330 (and the other various storage elements discussed herein) may be physical data storage, such as semiconductor memory, a solid-state drive (SSD), hard disk drive, optical memory, an optical storage device, or any other suitable physical data storage medium, or some combination thereof.

Database block cache 360, in some embodiments, is configured to store unencrypted data fragments and may also store an unencrypted version of the corresponding block index. In the illustrated embodiment, database block cache 360 stores a fragment 362 for tenant A in clear text (unencrypted) and another fragment 364 for tenant K in encrypted form. For example, cryptographic module 345 may encrypt fragment 364 and then store it in database block cache 360. As another example, cryptographic module 345 may access database block cache 360 to obtain tenant fragment 362 in order to encrypt this fragment. Multi-tenant database server 310 may perform various operations on the fragments stored in database block cache 360, such as filtering, sorting, indexing, etc. Therefore, database block cache 360 may facilitate operations on data in database 330 without a need to decrypt/encrypt data for each operation. Once multi-tenant database server 310 is finished operating on data in database block cache 360, it may persist the fragments by storing them in database 330.

Memory storage 370, in some embodiments, is configured to store committed and/or uncommitted transaction data for tenants of the multi-tenant database system. In some embodiments, cryptographic module 345 may access data in memory storage 370 for encryption and storage in database 330, in certain situations.

Disclosed embodiments provide encryption for multitenant database systems, where database operations such as filtering, sorting, and indexing, and the like for tenant data that is stored in an encrypted form are supported. Encryption of the tenant data may be performed by the multitenant database system, rather than at an application server, so that database operations (e.g., filtering, sorting, and the like) may be utilized. Data for each tenant of the multitenant database system may be separately encrypted, where each tenant has its own tenant ID and encryption key. In the multitenant database system, portions of different tenant data may logically belong to at least one of the same database objects (e.g., database table).

In particular, fragments which contain records of tenant data for a particular tenant may be encrypted. Fragments may be the basic data unit in the multi-tenant database system of the disclosed subject matter, with multiple fragments making up an extent. The data extents may include one or more fragments of tenant data and block indices. Fragments may be segregated based on a tenant ID, and the segregated fragments may be individually encrypted using the encryption key for the tenant of that fragment.

In disclosed embodiments, a memory storage of the multitenant database system of the disclosed subject matter may include both committed and uncommitted transactions that have not been written to persistence in the multitenant database. The committed transactions may be encrypted before being written to persistence, e.g., in database 330. In some implementations, the multitenant database system uses a daemon to manage the segregation of tenant data of the transactions to be committed into fragments. That is, different tenants may be segregated for purposes of encryption. A key cache may store encryption keys for each tenant. Keeping copies of the encryption keys in key cache 150 may reduce the time overhead of retrieving the encryption keys from KMS 340.

When a query is received by the multitenant database system to access data for a particular tenant, database block cache 360 may be initially checked by the query engine of the multitenant database system to determine if the data is unencrypted and available, as this may be quicker than retrieving it from database 330. The query engine of the multitenant database system may operate to retrieve tenant data when the data in the database block cache is unencrypted (i.e., the data is plain text, and not cypher text). In other situations, cryptographic module 345 may be operable to retrieve encrypted data from database block cache 360 and decrypt the data within the boundary of secure enclave 112 using one or more private keys retrieved from key cache 150. If the data is not available in database block cache 360, the requested tenant data may be retrieved from immutable storage where it is stored in encrypted form. The tenant data may be decrypted within secure enclave 112 and provided to the database block cache 360 so that it may be used by the query engine to perform a database operation (e.g., filter, sort, or the like).

Cross-tenant data (e.g., block indices, transaction logs, and the like that include one or more tenants) may be encrypted and decrypted using a system encryption key that is different from any of the tenant encryption keys. In contrast to a system encryption key, which is created and persisted in KMS 340, a protection key may be used to enhance security of the key cache 150. Specifically, a protection key may be a short-lived key that is managed within multi-tenant database server 310 and is rotated frequently. For example, the protection key may be an ephemeral key and, therefore, is not created or managed in KMS 340. This protection key may be stored within secure enclave 112 and, therefore, cryptographic module 345 may be able to access the protection key in order to decrypt key cache 150 prior to obtaining private keys stored in key cache. For example, the protection key may be used to encrypt in-memory copies of tenant keys and system keys residing in key cache 150.

Implementations of the disclosed subject matter may provide secure key management for tenant encryption by storing key material in a key cache that in turn is stored in secure enclave memory managed by the multi-tenant database system. The key management system may include management of tenant encryption keys, system encryption keys to encrypt cross tenant data, and/or creation and deletion of encryption keys. In some implementations, encryption keys (e.g., tenant encryption keys and/or system encryption keys) may be rotated (i.e., changed) at a predetermined cadence to maintain security. In some implementations, tenants (or particular users) may request key rotation (for security purposes), and the corresponding data may be re-written as a new version with the new key in a separate data extent.

In some embodiments, multi-tenant database server 310 manages multiple database instances. These database instances may be designated as master or standby nodes. In disclosed techniques, a key cache is implemented locally for each database instance, where each local key cache is not shared across different instances. These local caches may be filled (e.g., private key data is retrieved from the KMS and stored in the cache) on demand by each individual database instance based on fragments that this particular database instance is accessing. Thus, local key caches are not shared across standby nodes.

Example Key Cache Pre-Fetch Techniques

In some embodiments, cryptographic module 345 is configured to pre-fetch encryption keys into key cache 150 in certain situations. This may involve requesting keys from key management system 340 and caching the keys once they are received. Examples of such situations include flush or merge operations and database bootup.

In some embodiments, the system maintains a list of tenants that have active data in memory (e.g., in memory storage 370). Active data may be data that is un-flushed or un-merged, for example. If these tenants do not already have active security keys in key cache 150, cryptographic module 345 may pre-fetch keys for those tenants. In some embodiments, the system is configured to wait until the list of tenants needing keys reaches a threshold value and then send a bulk key fetch request. Key management system 340 may implement a bulk load API to handle this request. In some embodiments, this may allow key cache 150 to be populated in time for the data that is being flushed or merged to be ready and may reduce encryption latency for the operation.

In some embodiments, cryptographic module 345 is configured to issue a bulk key request in association with boot-up of the database system (e.g., a cold bring-up). In some embodiments, the number of requested keys may be based on the relationship between the number of tenants and the size of the key cache 150. For example, in some embodiments, if keys for all the current tenants can be stored in key cache 150 then cryptographic module 345 may request keys for all tenants. Otherwise, cryptographic module 345 may select a smaller number of tenants for the batch request in order to fill only a threshold portion of the cache (e.g., 50%, 60%, 70%, etc.). This may reduce cache thrashing while improving encryption performance by pre-loading keys for a portion of the current tenants.

Example Method

Figure 4:
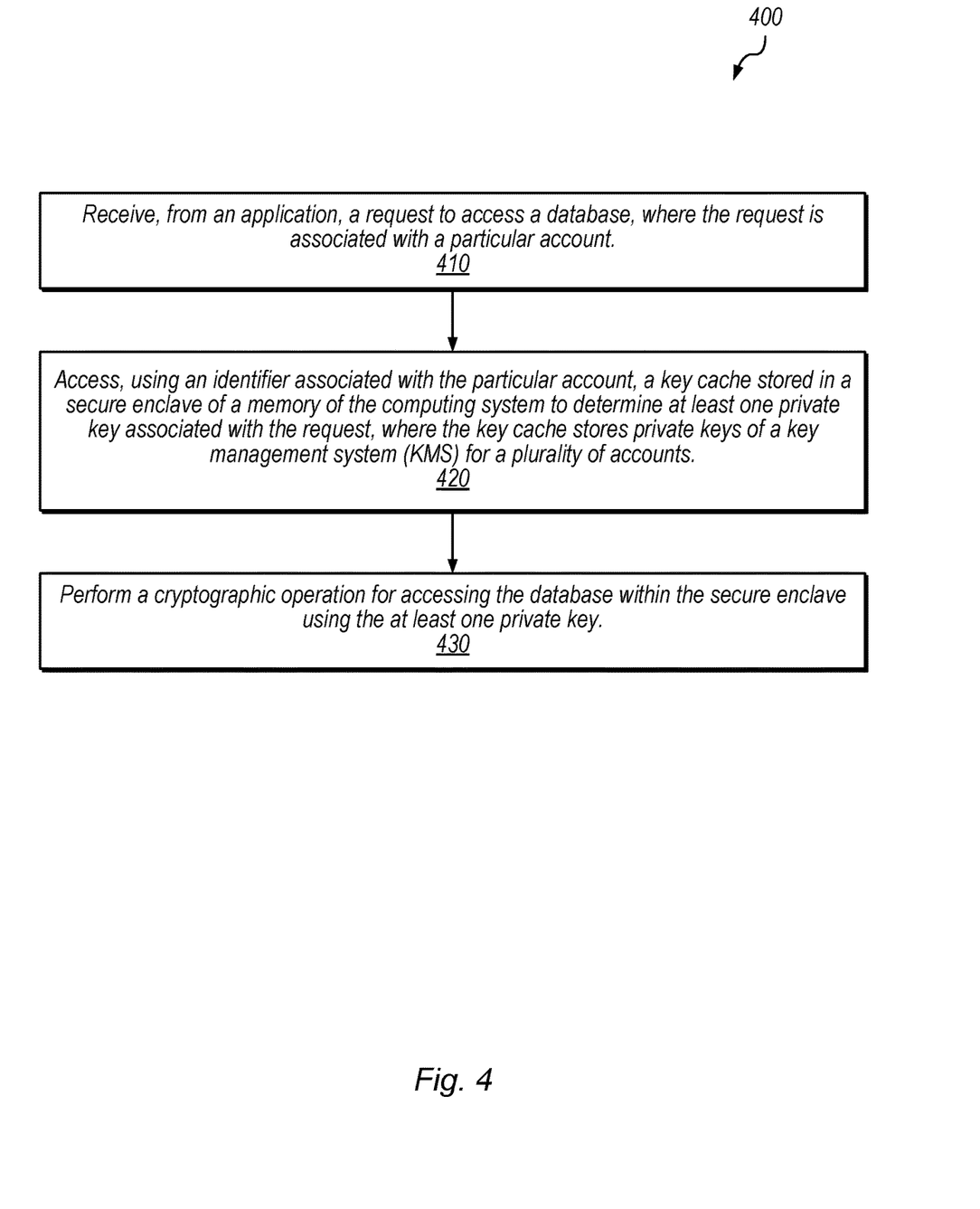
FIG. 4 is a flow diagram illustrating an example method for performing a cryptographic operation to access a database within a secure enclave using a private key, according to some embodiments.

FIG. 4 is a flow diagram illustrating a method for caching runtime state, according to some embodiments. The method shown in FIG. 4 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 410, in the illustrated embodiment, a computing system receives, from an application, a request to access a database, wherein the request is associated with a particular account. In some embodiments, the request specifies an account identifier of the particular account. In some embodiments, accessing the key cache to determine the at least one private key associated with the request is performed based on the account identifier.

At 420, the computing system accesses, using an identifier associated with the particular account, a key cache stored in a secure enclave of a memory of the computing system to determine at least one private key associated with the request, wherein the key cache stores private keys of a key management system (KMS) for a plurality of accounts. In some embodiments, the key cache includes a first portion that stores information mapping active private keys of the KMS to the plurality of accounts and a second portion that stores both active and inactive private keys of the KMS for the plurality of accounts. In some embodiments, the identifier associated with the particular account is an account identifier.

At 430, in the illustrated embodiment, the computing system performs a cryptographic operation for accessing the database within the secure enclave using the at least one private key. In some embodiments, performing the cryptographic operation includes accessing the key cache to obtain one or more private keys associated with one or more fragments of data stored in the database, wherein the fragments of data are associated with a plurality of tenants.

In some embodiments, performing the cryptographic operation within the secure enclave includes, accessing, based on the account identifier, the first portion of the key cache to determine a key identifier of an active private key associated with the particular account. In some embodiments, performing the cryptographic operation includes accessing, based on the determined key identifier, the second portion of the key cache to determine the active private key. In some embodiments, performing the cryptographic operations includes generating, using the determined active private key, an encrypted fragment of data for storage in the database, where the encrypted fragment of data is associated with the particular account.

In some embodiments, performing the cryptographic operation within the secure enclave includes accessing, based on a key identifier, the second portion of the key cache, but not the first portion of the key cache, to determine at least one private key. In some embodiments, performing the cryptographic operation includes decrypting, using the determined private key, an encrypted fragment of data specified in the request. In some embodiments, the identifier associated with the particular account is determined by locating, based on a pointer specified in the request, an encrypted fragment of data associated with the particular account. In some embodiments, the identifier associated with the particular account is determined by reading, from a header of the encrypted fragment of data, a key identifier of at least one private key.

In some embodiments, prior to caching a plurality of private keys in the key cache, the computing system obfuscates, using one or more binary operations, at least one of the plurality of private keys. In some embodiments, accessing the key cache includes decrypting the key cache using an ephemeral key. In some embodiments, the computing system encrypts the key cache using a system key.

In some embodiments, a portion of the computing system that is stored externally to the secure enclave requests to access at least one of the first or second portions of the key cache within the secure enclave. In some embodiments, the portion of the computing system receives a notification indicating that the request is blocked. For example, processes running externally to the secure enclave are not trusted by the enclave and, therefore, are not allowed to access content of the enclave.

Example Multi-Tenant Database System

Figure 5:
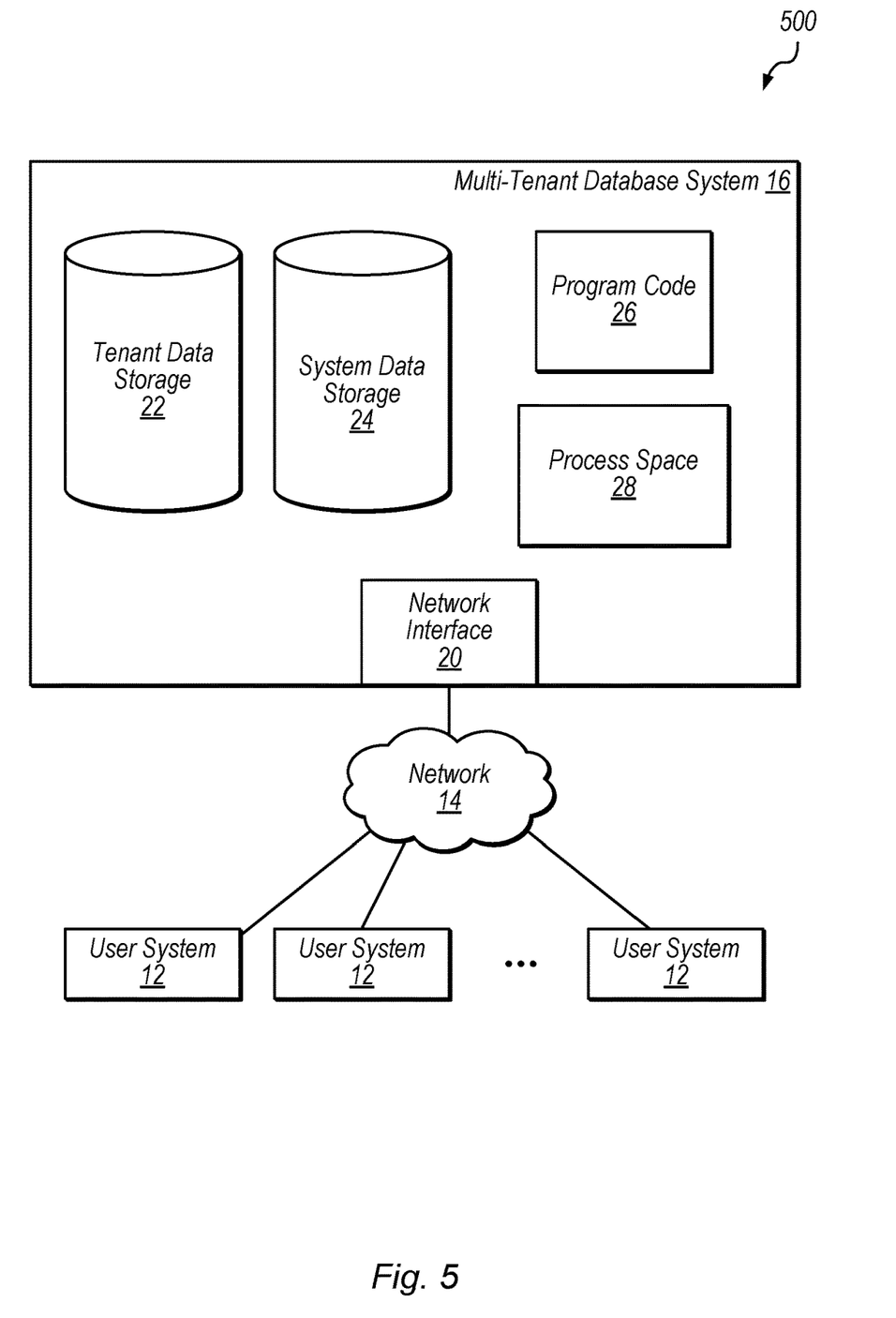
FIG. 5 is a diagram illustrating an example multi-tenant database system, according to some embodiments.

FIG. 5 illustrates an exemplary environment in which a multi-tenant database system might be implemented. As illustrated in FIG. 5 (and in more detail in FIG. 6) one or more user systems 12 may interact via a network 14 with a multi-tenant database system (MTS) 16. The users of those user systems 12 may be users in differing capacities and the capacity of a particular user system 12 might be determined by the current user. For example, when a salesperson is using a particular user system 12 to interact with MTS 16, that user system 12 may have the capacities allotted to that salesperson. However, while an administrator is using the same user system 12 to interact with MTS 16, it has the capacities allotted to that administrator.

Network 14 may be a LAN (local area network), WAN (wide area network), wireless network, point-to-point network, star network, token ring network, hub network, or any other appropriate configuration. The global internetwork of networks often referred to as the "Internet" with a capital "I," will be used in many of the examples herein and is one example of a TCP/IP (Transfer Control Protocol and Internet Protocol) network. It should be understood, however, that the networks that the present invention may utilize any of various other types of networks.

User systems 12 may communicate with MTS 16 using TCP/IP and, at a higher network level, use other common Internet protocols to communicate, such as HTTP, FTP, AFS, WAP, etc. As an example, where HTTP is used, user system 12 might include an HTTP client commonly referred to as a "browser" for sending and receiving HTTP messages from an HTTP server at MTS 16. Such a server might be implemented as the sole network interface between MTS 16 and network 14, but other techniques might be used as well or instead. In some implementations, the interface between MTS 16 and network 14 includes load sharing functionality, such as round-robin HTTP request distributors to balance loads and distribute incoming HTTP requests evenly over a plurality of servers. Preferably, each of the plurality of servers has access to the MTS's data, at least for the users that are accessing a server.

In some embodiments, the system shown in FIG. 5 implements a web-based customer relationship management (CRM) system. For example, in some embodiments, MTS 16 includes application servers configured to implement and execute CRM software applications as well as provide related data, code, forms, web pages and other information to and from user systems 12 and to store to, and retrieve from, a database system related data, objects and web page content. In embodiments of a multi-tenant system, tenant data is preferably arranged so that data of one tenant is kept separate from that of other tenants so that that one tenant does not have access to another tenant's data, unless such data is expressly shared. Tenants may share the same data structures, however, even when data is kept separate. For example, multiple tenants have data stored in a given database table (e.g., in different rows of the table).

One arrangement for elements of MTS 16 is shown in FIG. 5, including a network interface 20, storage 22 for tenant data, storage 24 for system data accessible to MTS 16 and possibly multiple tenants, program code 26 for implementing various functions of MTS 16, and a process space 28 for executing MTS system processes and tenant-specific processes, such as running applications as part of an application service.

Several elements in the system shown in FIG. 5 may include conventional, well-known elements that need not be explained in detail here. For example, each user system 12 may be a desktop personal computer, workstation, laptop, PDA, cell phone, or any WAP-enabled device or any other computing device capable of interfacing directly or indirectly to the Internet or other network connection. User system 12 may execute an HTTP client, e.g., a browsing program, such as Microsoft's Internet Explorer™ browser, Netscape's Navigator™ browser, Opera's browser, or a WAP-enabled browser in the case of a cell phone, PDA or other wireless device, or the like, allowing a user (e.g., subscriber of a CRM system) of user system 12 to access, process, and view information and pages available to it from MTS 16 over network 14. Each user system 12 may include one or more user interface devices, such as a keyboard, a mouse, touch screen, pen or the like, for interacting with a graphical user interface (GUI) provided by the browser on a display monitor screen, LCD display, etc. in conjunction with pages, forms and other information provided by MTS 16 or other systems or servers. As discussed above, the present invention is suitable for use with the Internet, which refers to a specific global internetwork of networks. It should be understood, however, that other networks may be used instead of the Internet, such as an intranet, an extranet, a virtual private network (VPN), a non-TCP/IP based network, any LAN or WAN or the like.

In some embodiments, each user system 12 and its components are operator configurable using applications, such as a browser, that include computer code executable on one or more processing elements. Similarly, in some embodiments, MTS 16 (and additional instances of MTSs, where more than one is present) and their components are operator configurable using application(s) that include computer code executable on one or more processing elements. Thus, various operations described herein may be performed by executing program instructions stored on a non-transitory computer-readable medium and executed by one or more processing elements. The program instructions may be stored on a non-volatile medium such as a hard disk, or may be stored in any other volatile or non-volatile memory medium or device as is well known, such as a ROM or RAM, or provided on any media capable of staring program code, such as a compact disk (CD) medium, digital versatile disk (DVD) medium, a floppy disk, and the like. Additionally, the entire program code, or portions thereof, may be transmitted and downloaded from a software source, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in any programming language that can be executed on a server or server system such as, for example, in C, C+, HTML, Java, JavaScript, or any other scripting language, such as VBScript.

According to one embodiment, each MTS 16 is configured to provide web pages, forms, applications, data, and/or media content to user systems 12 to support the access by user systems 12 as tenants of MTS 16. As such, in this embodiment, MTS 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, MTSs may include one or more logically and/or physically connected servers distributed locally or across one or more geographic locations. Additionally, the term "server" includes a computer system, including processing hardware and process space(s), and an associated storage system and database application as is well known in the art. It should also be understood that "server system" and "server" are often used interchangeably herein. Similarly, the databases described herein can be implemented as single databases, a distributed database, a collection of distributed databases, a database with redundant online or offline backups or other redundancies, etc., and might include a distributed database or storage network and associated processing intelligence.

Figure 6:
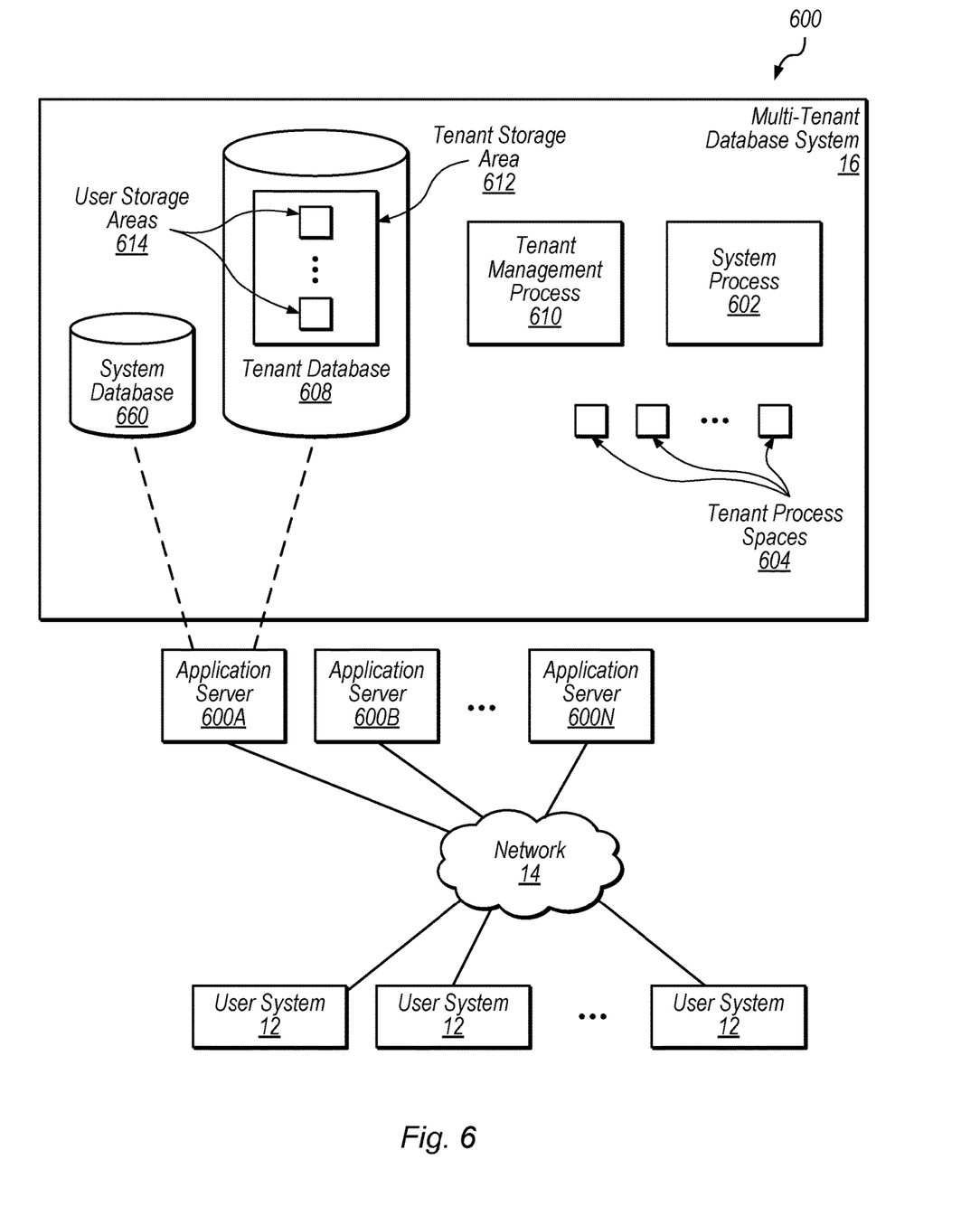
FIG. 6 is a diagram illustrating a more detailed example multi-tenant database system, according to some embodiments.

FIG. 6 illustrates exemplary embodiments of an MTS 16 and various interconnections in more detail. In this example, the network interface is implemented as one or more HTTP application servers 600. These application servers may be of different types or may implement similar functionality. Also shown is system process space 602 including individual tenant process spaces 604, a system database 660, tenant database(s) 608 and a tenant management process space 610. Tenant database 608 might be divided into individual tenant storage areas 612, which can be either a physical arrangement or a logical arrangement. Within each tenant storage area 612, user storage 614 might be allocated for each user.

It should also be understood that each application server 600 may be communicably coupled to database systems, e.g., system database 660 and tenant database(s) 608, via, a different network connection. For example, one server 600 I might be coupled via the Internet, another server 600 N−1 might be coupled via a direct network link, and another server 600 N might be coupled by yet a different network connection. Transfer Control Protocol and Internet Protocol (TCP/IP) are preferred protocols for communicating between servers 600 and the database system, however, it will be apparent to one skilled in the art that other transport protocols may be used to optimize the system depending on the network interconnect used.

In preferred aspects, each application server 600 is configured to handle requests for any user/organization. Because it is desirable to be able to add and remove application servers from the server pool at any time for any reason, there is preferably no server affinity for a user and/or organization to a specific application server 600. In one embodiment, therefore, an interface system (not shown) implementing a load balancing function (e.g., an F5 Big-IP load balancer) is communicably coupled between the servers 600 and the user systems 12 to distribute requests to the servers 600. In one aspect, the load balancer uses a least connections algorithm to route user requests to the servers 600. Other examples of load balancing algorithms, such as are round robin and observed response time, also can be used. For example, in certain aspects, three consecutive requests from the same user could hit three different servers, and three requests from different users could hit the same server. In this manner, MTS 16 is multi-tenant, wherein the MTS 16 handles storage of different objects and data across disparate users and organizations.

As an example of storage, one tenant might be a company that employs a sales force where each salesperson uses MTS 16 to manage their sales process. Thus, a user might maintain contact data, leads data customer follow-up data, performance data, goals and progress data, all applicable to that user's personal sales process (e.g., in tenant database 608). In some MTS embodiments, since all of this data and the applications to access, view, modify, report, transmit, calculate, eta, can be maintained and accessed by a user system having nothing more than network access, the user can manage his or her sales efforts and cycles from any of many different user systems. For example, if a salesperson is paying a visit to a customer and the customer has Internet access in their lobby, the salesperson can obtain critical updates as to that customer while waiting for the customer to arrive in the lobby.

While each user's sales data may be separate from other users' sales data regardless of the employers of each user, some data may be organization-wide data shared or accessible by a plurality or all of the sales three for a given organization that is a tenant. Thus, there may be some data structures managed by MTS 16 that are allocated at the tenant level while other data structures are managed at the user level. Because an MTS may support multiple tenants including possible competitors, the MTS should have security protocols that keep data, applications and application use separate. Also, because many tenants will opt for access to an MTS rather than maintain their own system, security, redundancy, up-time and backup are more critical functions and need to be implemented in the MTS.

In addition to user-specific data and tenant-specific data, MTS 16 might also maintain system level data usable by multiple tenants. Such system level data might include industry reports, news, postings, and the like that are sharable among tenants.

In certain aspects, client systems 12 communicate with application servers 600 to request and update system-level and tenant-level data from MTS 16 that may require one or more queries to system database 660 and/or tenant database 608. In some embodiments, MTS 16 automatically generates one or more SQL statements (the SQL query) designed to access the desired information.

Each database may generally be viewed as a set of logical tables containing data fitted into predefined categories. Each table typically contains one or more data categories logically arranged in physical columns. Each row of a table typically contains an instance of data for each category defined by the columns. For example, a CRM database may include a table that describes a customer with columns for basic contact information such as name, address, phone number, fax number, etc. Another table may describe a purchase order, including columns for information such as customer, product, sale price, date, etc. As discussed above, a given table may be shared by multiple tenants.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable medium having instructions stored thereon that are capable of causing a computing system to implement operations comprising:
   receiving, from an application, a request to access a database, wherein the request is associated with a particular account;
   accessing, using an identifier associated with the particular account, a key cache stored in a secure enclave of a memory of the computing system to determine at least one private key associated with the request, wherein the key cache includes a first portion that stores information mapping active private keys of a key management system (KMS) to a plurality of accounts and a second portion that stores both active and inactive private keys of the KMS for the plurality of accounts; and
   performing a cryptographic operation for accessing the database within the secure enclave using the at least one private key, including:
      accessing, based on a key identifier, the second portion of the key cache, but not the first portion of the key cache, to determine at least one private key; and
      decrypting, using the determined private key, an encrypted fragment of data specified in the request.

2. The non-transitory computer-readable medium of claim 1, wherein performing the cryptographic operation includes accessing the key cache to obtain one or more private keys associated with one or more fragments of data stored in the database.

3. The non-transitory computer-readable medium of claim 2, wherein the one or more fragments of data are associated with a plurality of tenants.

4. The non-transitory computer-readable medium of claim 3, wherein the identifier associated with the particular account is an account identifier, and wherein performing the cryptographic operation within the secure enclave includes:
   accessing, based on the account identifier, the first portion of the key cache to determine a key identifier of an active private key associated with the particular account;
   accessing, based on the determined key identifier, the second portion of the key cache to determine the active private key; and
   generating, using the determined active private key, an encrypted fragment of data for storage in the database, wherein the encrypted fragment of data is associated with the particular account.

5. The non-transitory computer-readable medium of claim 1, wherein the operations further comprise:
   encrypting, using an ephemeral key, the key cache.

6. The non-transitory computer-readable medium of claim 1, wherein the identifier associated with the particular account is determined by:
   locating, based on a pointer specified in the request, an encrypted fragment of data associated with the particular account; and
   reading, from a header of the encrypted fragment of data, a key identifier of at least one private key.

7. The non-transitory computer-readable medium of claim 1, wherein the request specifies an account identifier of the particular account, and wherein the accessing the key cache to determine the at least one private key associated with the request is performed based on the account identifier.

8. The non-transitory computer-readable medium of claim 1, wherein the operations further comprise:
   prior to caching a plurality of private keys in the key cache, obfuscating, using one or more binary operations, at least one of the plurality of private keys.

9. The non-transitory computer-readable medium of claim 1, wherein accessing the key cache includes decrypting the key cache using an ephemeral key.

10. A method, comprising:
   receiving, by a computing system from an application, a request to access a database, wherein the request is associated with a particular account;
   accessing, by the computing system using an identifier associated with the particular account, a key cache stored in a secure enclave of a memory of the computing system to determine at least one private key associated with the request, wherein the key cache includes a first portion that stores information mapping active private keys of a key management system (KMS) to a plurality of accounts of the database and a second portion that stores both active and inactive private keys of the KMS for the plurality of accounts; and
   causing, by the computing system, performance of a cryptographic operation for accessing the database within the secure enclave using the at least one private key, including:
      accessing, based on a key identifier, the second portion of the key cache, but not the first portion of the key cache, to determine at least one private key; and
      decrypting, using the determined private key, an encrypted fragment of data specified in the request.

11. The method of claim 10, wherein private keys stored by the key cache are usable to access fragments of data stored in the database for a plurality of tenants.

12. The method of claim 10, wherein the identifier associated with the particular account is an account identifier, and wherein performing the cryptographic operation within the secure enclave includes:
   accessing, based on the account identifier, the first portion of the key cache to determine a key identifier of an active private key associated with the particular account;
   accessing, based on the determined key identifier, the second portion of the key cache to determine the active private key; and
   generating, using the determined active private key, an encrypted fragment of data for storage in the database, wherein the encrypted fragment of data is associated with the particular account.

13. The method of claim 10, wherein performing the cryptographic operation within the secure enclave further includes, prior to accessing the second portion of the key cache:
   locating, based on a pointer specified in the request, an encrypted fragment of data associated with the particular account; and
   reading, from a header of the encrypted fragment of data, the key identifier of at least one private key.

14. The method of claim 10, further comprising:
   encrypting, by the computing system using an ephemeral key, the key cache.

15. The method of claim 10, further comprising:
   requesting, by a portion of the computing system that is stored externally to the secure enclave, to access at least one of the first and second portions of the key cache within the secure enclave; and
   receiving, by the portion of the computing system, a notification indicating that the request is blocked.

16. A system, comprising:

at least one processor; and a memory having instructions stored thereon that are executable by the at least one processor to cause the system to:

receive, from an application, a request to access a database, wherein the request is associated with a particular account;

access, using an identifier associated with the particular account, a key cache stored in a secure enclave of the memory of the system to determine at least one private key associated with the request, wherein the key cache includes a first portion that stores information mapping active private keys of a key management system (KMS) to a plurality of accounts and a second portion that stores both active and inactive private keys of the KMS for the plurality of accounts; and perform a cryptographic operation for accessing the database within the secure enclave using the at least one private key, including:

accessing, based on a key identifier, the second portion of the key cache, but not the first portion of the key cache, to determine at least one private key; and decrypting, using the determined private key, an encrypted fragment of data specified in the request.

17. The system of claim 16, wherein performing the cryptographic operation includes accessing the key cache to obtain one or more private keys associated with one or more fragments of data stored in the database.

18. The system of claim 17, wherein the one or more fragments of data are associated with a plurality of tenants.

19. The system of claim 18, wherein the identifier associated with the particular account is an account identifier, and wherein performing the cryptographic operation within the secure enclave includes:

accessing, based on the account identifier, the first portion of the key cache to determine a key identifier of an active private key associated with the particular account;

accessing, based on the determined key identifier, the second portion of the key cache to determine the active private key; and generating, using the determined active private key, an encrypted fragment of data for storage in the database, wherein the encrypted fragment of data is associated with the particular account.

20. The system of claim 16, wherein the instructions are further executable to cause the system to:

encrypt, using an ephemeral key, the key cache.

* * * * *